United States Patent
Higuchi et al.

(10) Patent No.: US 12,125,502 B2
(45) Date of Patent: *Oct. 22, 2024

(54) MOVIE CREATION METHOD, NON-TRANSITORY COMPUTER READABLE MEDIUM, AND MOVIE CREATION APPARATUS

(71) Applicant: Honda Motor Co., Ltd., Tokyo (JP)

(72) Inventors: Takaya Higuchi, Tokyo (JP); Makiko Ikarashi, Tokyo (JP); Haruka Miyata, Tokyo (JP); Arisa Omura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 17/975,540

(22) Filed: Oct. 27, 2022

(65) Prior Publication Data

US 2023/0133148 A1 May 4, 2023

(30) Foreign Application Priority Data

Nov. 2, 2021 (JP) ................. 2021-179222

(51) Int. Cl.
*G11B 27/034* (2006.01)
*G11B 27/036* (2006.01)
*G11B 27/34* (2006.01)

(52) U.S. Cl.
CPC .......... *G11B 27/034* (2013.01); *G11B 27/036* (2013.01); *G11B 27/34* (2013.01)

(58) Field of Classification Search
CPC ............................ G11B 27/034; G11B 27/036
See application file for complete search history.

(56) References Cited

U.S. PATENT DOCUMENTS

2020/0388063 A1 12/2020 Kunieda et al.

FOREIGN PATENT DOCUMENTS

| JP | 2002140450 A | 5/2002 |
| JP | 2004357774 A | 12/2004 |
| JP | 2006279266 A | 10/2006 |
| JP | 2013030076 A | 2/2013 |
| JP | 2020201679 A | 12/2020 |

OTHER PUBLICATIONS

Japanese office action; Application 2021-179222; Jul. 11, 2023.

*Primary Examiner* — Girumsew Wendmagegn
(74) *Attorney, Agent, or Firm* — Duft & Bornsen, PC (57) ABSTRACT

A movie creation method for creating a movie by combining a plurality of video clips photographed by a camera, includes: executing a movie project. The movie project includes: determining a number of the video clips to be combined as a video; outputting a control signal to the camera to photograph the determined number of the video clips; outputting a control signal to a positioning unit to acquire position information on photographing locations of the video clips; calculating a total travel distance for photographing the determined number of the video clips by connecting the photographing locations by a straight line in an order of photographing; setting an incentive for a user of the camera based on the total travel distance; and creating the video by combining the determined number of the video clips.

11 Claims, 9 Drawing Sheets

MOVIE CREATION METHOD, NON-TRANSITORY COMPUTER READABLE MEDIUM, AND MOVIE CREATION APPARATUS

CROSS-REFERENCE TO RELATED APPLICATION

This application is based upon and claims the benefit of priority from Japanese Patent Application No. 2021-179222 filed on Nov. 2, 2021, the content of which is incorporated herein by reference.

BACKGROUND OF THE INVENTION

Field of the Invention

This invention relates to a movie creation method, non-transitory computer readable medium, and movie creation apparatus configured to create movie.

Description of the Related Art

Portable wireless terminals such as smartphones can take video in addition to still images. In general, video recording functions using portable wireless terminals have fewer opportunities to be used than still image recording functions, so some effort is needed to increase the opportunities for use of video recording functions. For example, it is known to grant incentives such as contents to users to encourage them to use the functions provided by portable wireless terminals.

Japanese Patent Application Laid-Open No. 2002-140450 (JP 2002-140450 A) discloses a technology for distributing content related to information on the current position of a mobile phone to the mobile phone. Japanese Patent Application Laid-Open No. 2004-357774 (JP 2004-357774 A) discloses a technology for determining scores to be used in games played using mobile phones and other devices based on the distance traveled and other factors.

However, the technology described in JP 2002-140450 A requires the preparation of contents based on current position information for each position, which complicates operation. In addition, the technology described in JP 2004-357774 A requires constant positioning while the mobile phone or other device is moving, which causes problems related to power consumption of the mobile phone or other device. Both technologies are difficult to motivate users to actively take video.

SUMMARY OF THE INVENTION

An aspect of the present invention is a movie creation method for creating a movie by combining a plurality of video clips photographed by a camera. The movie creation method includes: executing a movie project. The movie project includes: determining a number of the video clips to be combined as a video; outputting a control signal to the camera to photograph the determined number of the video clips; outputting a control signal to a positioning unit to acquire position information on photographing locations of the video clips; calculating a total travel distance for photographing the determined number of the video clips by connecting the photographing locations by a straight line in an order of photographing; setting an incentive for a user of the camera based on the total travel distance; and creating the video by combining the determined number of the video clips.

Another aspect of the present invention is a non-transitory computer readable medium storing a movie creation program that, when executed by an electronic device including: a microcomputer; a camera configured to photograph a video clip; and a positioning unit configured to acquire position information on a photographing location of the video clip, causes the microcomputer to execute a movie project for creating a movie by combining a plurality of the video clips photographed by the camera. The movie project includes: determining a number of the video clips to be combined as a video; outputting a control signal to the camera to photograph the determined number of the video clips; outputting a control signal to the positioning unit to acquire position information on the photographing locations of the video clips; calculating a total travel distance for photographing the determined number of the video clips by connecting the photographing locations by a straight line in an order of photographing; setting an incentive for a user of the electronic device based on the total travel distance; and creating the video by combining the determined number of the video clips.

Another aspect of the present invention is a movie creation apparatus configured to execute a movie project for creating a movie by combining a plurality of video clips. The movie creation apparatus includes: a camera configured to photograph the video clips; and a positioning unit configured to acquire position information on photographing locations of the video clips. The movie project includes: determining a number of the video clips to be combined as a video; outputting a control signal to the camera to photograph the determined number of the video clips; outputting a control signal to the positioning unit to acquire the position information on photographing locations of the video clips; calculating a total travel distance for photographing the determined number of the video clips by connecting the photographing locations by a straight line in an order of photographing; setting an incentive for a user based on the total travel distance; and creating the video by combining the determined number of the video clips.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Embodiments of the present invention will be described below with reference to drawings.

<Outline of Movie Creation Program>

First, a movie creation program according to an embodiment is outlined.

The movie creation program is an application program that is executed on an electronic device such as a smartphone. Hereinafter it will be referred to simply as a movie creation application. The electronic device is not limited to a portable wireless terminal such as a smartphone, but may also be a tablet computer that includes a camera and a positioning unit or can be connected to them.

Figure 1A:
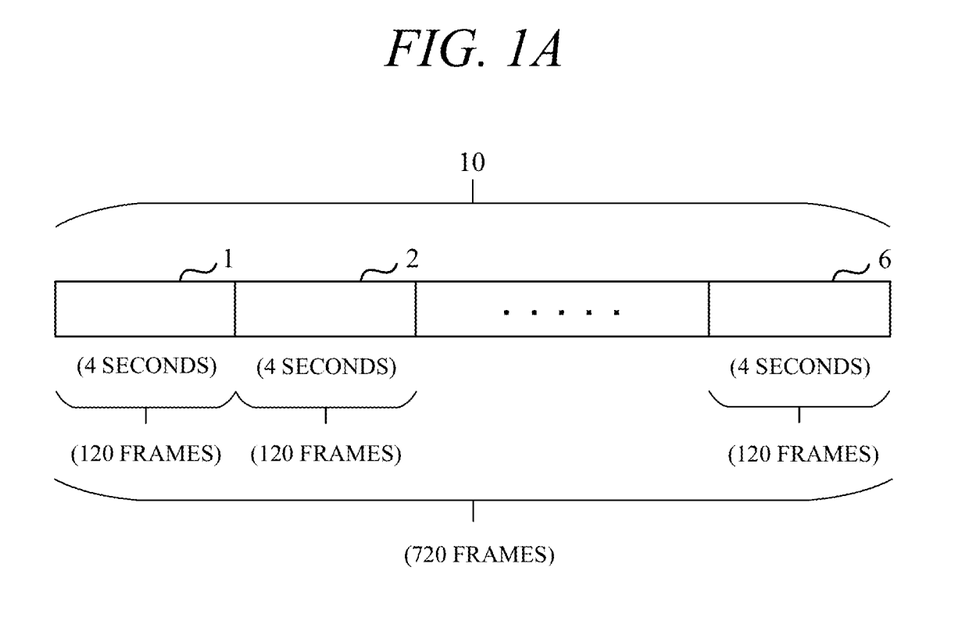
FIG. 1A is a schematic diagram illustrating a video created by an electronic device executing a movie creation application according to an embodiment of the present invention.

By running the movie creation application, the electronic device will be able to create a video based on a plurality of video clips taken by the camera. FIG. 1A is a schematic diagram illustrating a video 10 created by an electronic device. A video 10 illustrated in FIG. 1A is composed of six video clips (video clips 1, 2, 3, . . . , 6) with a recording time of 4 seconds per clip (4 seconds×6 video clips). The playback time of the created video 10 is 24 seconds, excluding the display time of the end-title and others, which is equal to the total recording time of the video clips 1 to 6.

The recording time per clip of 4 seconds, the number of clips of 6, the total recording time, and the playback time of the video 10 of 24 seconds are examples and may be changed as appropriate.

Each of the video clips 1 to 6 is a moving image taken and recorded as a sequence of images from the start to end of photographing (also referred to as recording). For example, when the number of frames per second is set to 30 frames per second (30 fps), the video clip 1 with a recording time of 4 seconds per clip is composed of 4 seconds×30 fps=120 frames. The same is true for the video clips 2 to 6. The video 10 made by combining the video clips 1 to 6 is composed of 120 frames×6 video clips=720 frames.

The embodiment assumes that the photographing locations (photographing positions) of the video clips 1 to 6 are different. That is, it is assumed that users of the electronic device will be asked to travel to different photographing sites to take the video clips 1 to 6.

(Filter Processing)

The movie creation application of the embodiment creates a video 10 by combining the video clips 1 to 6, and can also create a processed video 10. The processing executed by the movie creation application is referred to as filter processing.

The filter processing adds image effects, for example, by processing the color of the video clips 1 to 6 to monochrome, processing the hue of the video clips 1 to 6 to sepia tone, emphasizing specific colors in the video clips 1 to 6, blurring specific parts of the screen in the video clips 1 to 6, or blurring the entire screen in the video clips 1 to 6.

The movie creation application of the embodiment can create a video 10 processed with a filter that is arbitrarily selected by the user from a plurality of filter candidates prepared in advance. The user may apply the same filter to all the video clips 1 to 6. It is also possible to apply different filters to the video clips constituting the video 10.

When creating the video 10 with the movie creation application, filter processing is performed for the video clips 1 to 6, and the video clips 1 to 6 after filter processing may be combined to create a video 10, or a filter may be added after combining the video clips 1 to 6 to create a video 10.

The filter processing may be omitted in order to create a video 10 that makes use of the color tone or the like of the video clips 1 to 6 as they are.

Figure 1B:
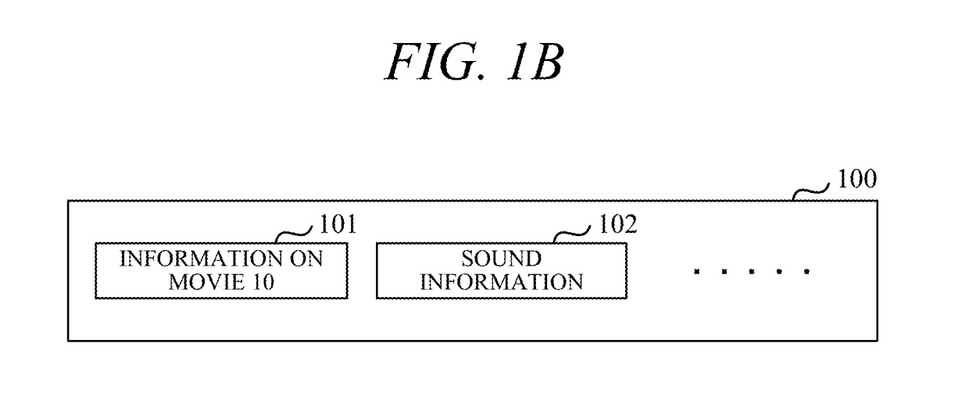
FIG. 1B is a schematic diagram illustrating a video file.

FIG. 1B is a schematic diagram illustrating a video file 100. Generally, the data of the video 10 (information 101 on the video 10) is recorded together with audio data (sound information 102) in a file format such as MP4. The file storing the information 101 on the video 10 and the sound information 102 is hereinafter referred to as a video file 100. The information 101 on the video 10 may include information on the photographing location.

(Addition of Music)

In the movie creation application of the embodiment, it is possible to record information on music selected arbitrarily by the user from a plurality of music candidates prepared in advance in the video file 100, together with the information 101 on the created video 10. The plurality of pieces of music information provided by the movie creation application include, for example, background music (BGM) information.

When a video based on the video file 100 created by the movie creation application is played on a general playback device, the user can listen to background music played based on the sound information 102 and watch the video played based on the information 101 on the video 10. The electronic device that executes the above movie creation application can also play back the video based on the information 101 on the video 10 (including BGM playing) as a playback device.

With the movie creation application outlined above, it is possible to take a plurality of video clips 1 to 6 with an electronic device, apply filters to the video clips 1 to 6, and create a video 10 by combining the video clips 1 to 6 after filter processing. The information 101 on the created video 10 can then be stored in the video file 100 together with the BGM information (sound information 102). This movie creation application is described in detail below.

<Examples of Electronic Devices>

Figure 2:
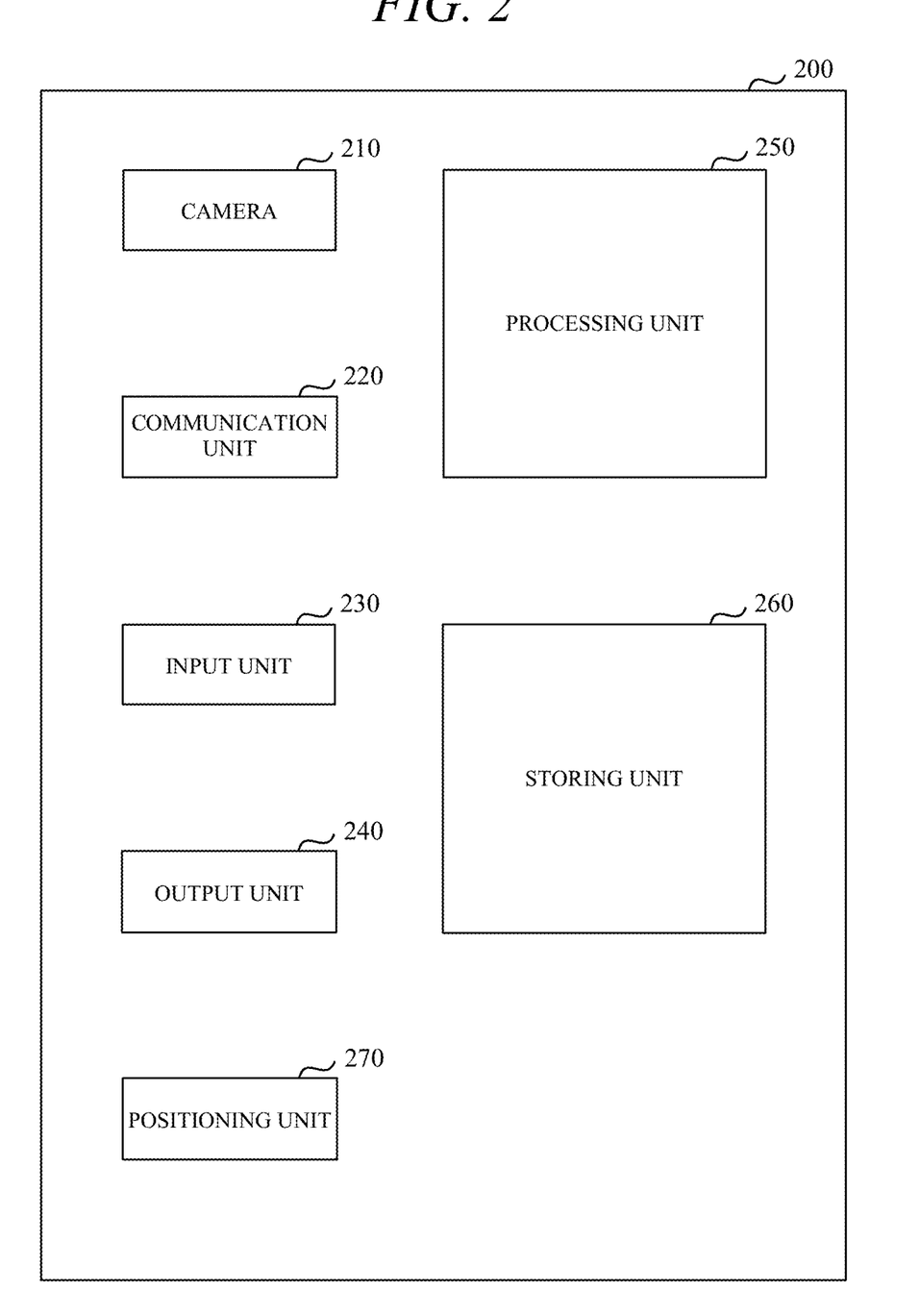
FIG. 2 is a block diagram illustrating key components of the electronic device executing the movie creation application.

FIG. 2 is a block diagram illustrating the key components of an electronic device 200 executing a movie creation application. In FIG. 2, the electronic device 200 is composed of a smartphone or the like, and includes a camera 210, a communication unit 220, an input unit 230, an output unit 240, a processing unit 250, a storing unit 260, and a positioning unit 270.

The camera 210 photographs the subject and outputs the image data to the processing unit 250 as image information. The camera 210 is configured to take still images or video. In the embodiment, a 4-second video (corresponding to the video clips 1 to 6 described above) is taken plural times (corresponding to 6 times described above).

The communication unit 220 executes wireless communication with external devices connected via communication networks such as wireless communication networks, Internet networks, and telephone line networks.

Since the electronic device 200 executing the movie creation application can execute all processes related to the movie creation application on the electronic device 200, there is no need to communicate with a server or other external device regarding the movie creation application during execution of the movie creation application.

The input unit 230 includes various user-operated operation units such as touch-operated components and switches, and a microphone for inputting voice projected by the user. The output unit 240 includes, for example, a display unit that displays text information, images, and others, and a speaker unit that plays back sound and the like. The user inputs the startup and setting operations of the movie creation application via the input unit 230, either by tapping or by voice input.

The processing unit 250 includes a microcomputer and its peripheral circuits. The processing unit 250 executes predetermined processes based on signals input via the input unit 230, signals received from outside via the communication unit 220, and data stored in the storing unit 260, and outputs control signals to the various parts of the electronic device 200, including the camera 210, communication unit 220, output unit 240, storing unit 260, and positioning unit 270.

The processes executed by the processing unit 250 allows the user to proceed with the photographing of the video clips 1 to 6 by the camera 210, the filter processing and music selection described above, and the video creation processes, while checking the information displayed on the output unit 240, according to the process flow of the movie creation application described below with reference to FIGS. 3 and 4.

The storing unit 260 includes a volatile or nonvolatile memory (not illustrated). The storing unit 260 stores various programs, including the movie creation application executed by the processing unit 250, and various data, including information on the video clips 1 to 6 to be taken, and the video files 100 to be created.

The positioning unit 270 detects the current position of the electronic device 200 based on positioning signals from global positioning system (GPS) satellites and quasi-zenith satellites. The signal indicating the current position of the electronic device 200 is output to the processing unit 250.

<Description of Flowchart>

Figure 3:
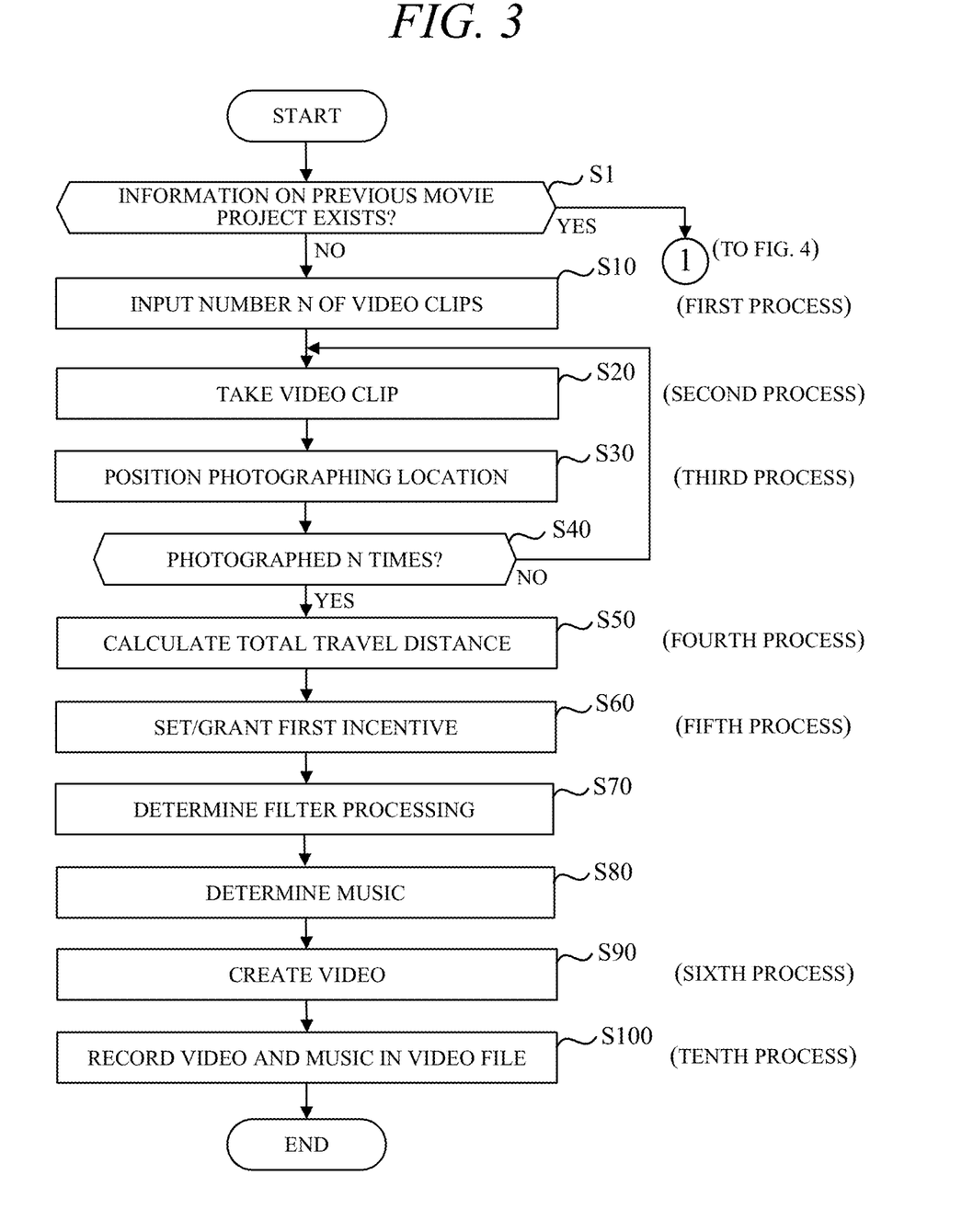
FIG. 3 is a flowchart illustrating flow of processes executed by a processing unit shown in FIG. 2 by the movie creation application.
Figure 4:
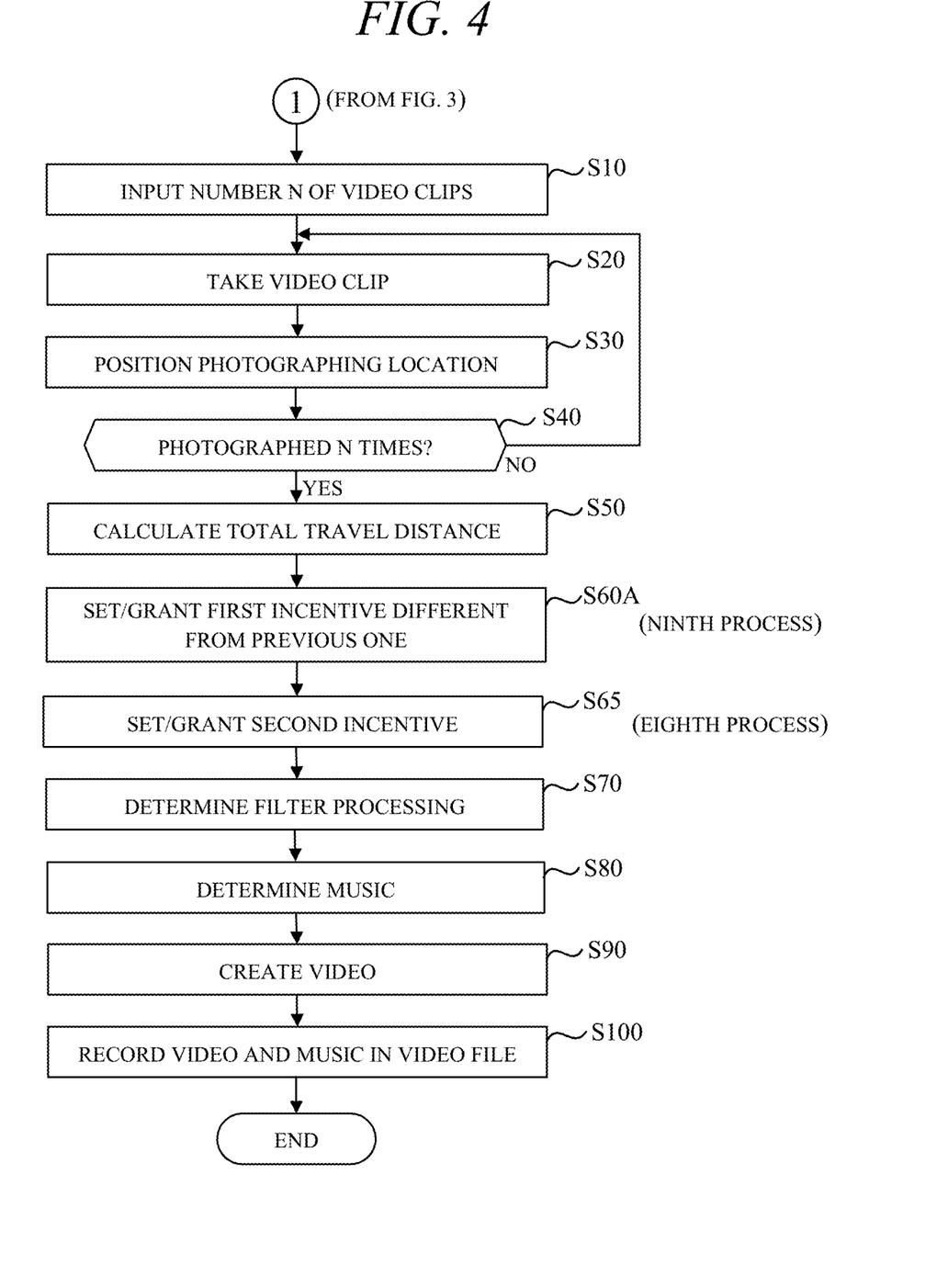
FIG. 4 is a flowchart illustrating flow of processes executed by the processing unit shown in FIG. 2 by the movie creation application.

FIGS. 3 and 4 are flowcharts illustrating the flow of processes executed by the processing unit 250 in FIG. 2 by the movie creation application. When the icon associated with the movie creation application among the icons displayed on the output unit 240, which are not illustrated, is tapped by the user, the processing unit 250 starts the movie creation application that executes the flows of FIGS. 3 and 4.

In S1 (S: processing step) of FIG. 3, the processing unit 250 determines whether or not information on the previous movie project exists in the storing unit 260. In the embodiment, the series of processes of taking a plurality of video clips 1 to 6 and creating a video 10 that combines the video clips 1 to 6 is referred to as a movie project. When a record of a previously executed movie project is stored in the storing unit 260, the processing unit 250 makes a positive determination in S1 and proceeds to S10 in FIG. 4. When a record of a previously executed movie project is not stored in the storing unit 260, the processing unit 250 makes a negative determination in S1 and proceeds to S10 in FIG. 3. i.e., when the movie project is executed for the first time, the processes in FIG. 3 are executed as they are, and when the movie project is executed for the second or subsequent times, the flow proceeds to the processes in FIG. 4.

In S10 of FIG. 3, the processing unit 250 determines the number of video clips N based on the operation input by the user via the input unit 230 and proceeds to S20. The number of video clips N is the number of video clips constituting a video 10. In the embodiment, it is assumed that N=6 is entered by the user. When N=6 is entered, the processing unit 250 determines the photographing time per clip to be 4 seconds so that the total recording time is 24 seconds. If N=12 is entered, the processing unit 250 determines the photographing time per clip to be 2 seconds so that the total recording time is 24 seconds. The process executed in S10 may be referred to as first process.

In S20, the processing unit 250 outputs a control signal to the camera 210, causes the camera 210 to take a video clip, and proceeds to S30. For example, when the photographing button 56 (FIG. 6C below) displayed on the output unit 240 is tapped, the processing unit 250 causes a video clip to be taken for 4 seconds. The process executed in S20 may be referred to as second process.

In S30, the processing unit 250 outputs a control signal to the positioning unit 270, causes the positioning unit 270 to position the current position of the electronic device 200, and proceeds to S40. The positioning unit 270, for example, acquires information indicating the current position at the time the video clip was started to be taken and outputs it to the processing unit 250 as information on the photographing location of the video clip. The process executed in S30 may be referred to as third process.

Since the positioning unit 270 positions only at the start of taking the video clip, allowing to reduce power consumption in the electronic device 200 compared to the case where positioning continues even during taking video clips (4 seconds in the embodiment).

In S40, the processing unit 250 determines whether the video clips have been taken N times. When the photographing number of video clips reaches N, the processing unit 250 makes a positive determination in S40 and proceeds to S50. When the photographing number of video clips is less than N times, the processing unit 250 makes a negative determination in S40, returns to S20, and repeats the above processes. In the embodiment, when the video clips are taken 6 times, the flow proceeds to S50.

In the above-described processes of S10 to S40, six 4-second video clips constituting a video 10 are taken, so the total recording time is 24 seconds.

In the embodiment, it is assumed that video clips in the process of being taken (i.e., before the photographing number of video clips has reached N or after the photographing number of video clips has reached N but not yet used to create a video 10) are temporarily stored in a predetermined area (for example, a work area for movie projects) in the storing unit 260 under the direction of the processing unit 250. This makes it possible, for example, to properly store video clips during photographing even when moving to the next photographing location or when other application is started on the electronic device 200 and the processes of the movie creation application is interrupted.

Figure 5:
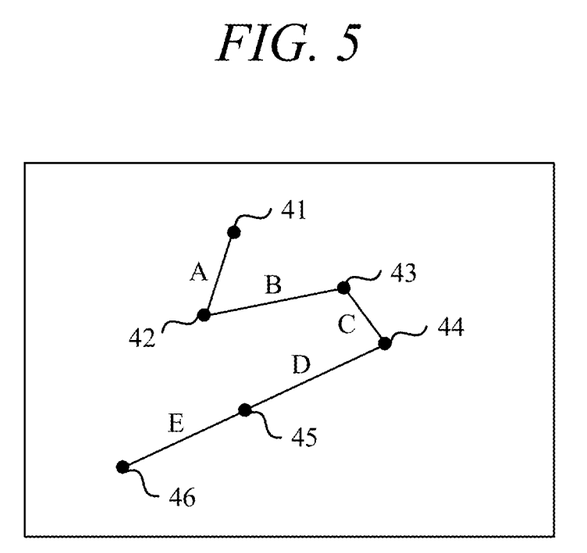
FIG. 5 is a diagram for describing a method of calculating a total travel distance.

In S50, the processing unit 250 calculates the total travel distance and proceeds to S60. FIG. 5 is a diagram for describing a method of calculating a total travel distance. In FIG. 5, the map indicates the photographing location 41 of the first video clip 1, the photographing location 42 of the second video clip 2, the photographing location 43 of the third video clip 3, the photographing location 44 of the fourth video clip 4, the photographing location 45 of the fifth video clip 5, and the photographing location 46 of the sixth video clip 6.

The processing unit 250 connects the photographing locations 41 to 46 for each of the N=6 video clips by straight lines A, B, C, D, and E, respectively, in the order of photographing, and calculates the total distance indicated by straight lines A to E as the total travel distance for the N=6 video clips. The process executed in S50 may be referred to as fourth process.

When straight lines A, B, C, D, and E connecting the photographing locations 41 to 46 for each photographing in the order of photographing are located on a straight line of a predetermined width (not illustrated), the distance on the straight line of the predetermined width shall be excluded from the total travel distance in order to exclude overlapping travel distances.

In S60, the processing unit 250 sets and grants a first incentive and proceeds to S70. The processing unit 250 sets and grants the first incentive to the user when the total travel distance calculated in S50 is above a predetermined distance (for example, 10 km). For example, the number of candidate songs of music information to be determined in S80, described below, is increased as the first incentive. The user who is granted the first incentive can choose songs from a larger number of candidate songs than users who are not granted the incentive. The process executed in S60 may be referred to as fifth process.

The processing unit 250 may also increase the number of filter candidates to be determined in S70, described below, as a first incentive.

In S70, the processing unit 250 determines the filter processing and proceeds to S80. The processing unit 250 determines the filter, which has been selected by the user from among a plurality of filter candidates prepared in advance by the movie creation application, as the filter applied to the video 10.

In S80, the processing unit 250 determines the music to be added to the information 101 on the video 10 and proceeds to S90. The processing unit 250 determines the BGM information selected by the user from a plurality of candidate BGM songs prepared in advance by the movie creation application as the sound information 102 to be recorded in the video file 100 together with the information 101 on the video 10.

In S90, the processing unit 250 creates a video 10 by combining a plurality of video clips 1 to 6 together and proceeds to S100. The processing unit 250 also executes the filter processing determined in S70. The process executed in S90 may be referred to as sixth process.

In S100, the processing unit 250 adds the sound information 102 determined in S80 to the information 101 on the created video 10, records it in the video file 100, records the video file 100 in a predetermined area of the storing unit 260, and terminates the flow in FIG. 3. i.e., in S100, the music information determined in S80 is added to the information 101 on the video 10. The process executed in S100 may be referred to as tenth process.

FIG. 4 is a flowchart that the processing unit 250 executes in the second and subsequent movie projects. When the processing unit 250 makes a positive determination in S1 in FIG. 3, it proceeds to S10 in FIG. 4. In FIG. 4, the processes denoted by the same reference numerals as those in the flowchart in FIG. 3 is the same as the processes described in FIG. 3, and thus description thereof is omitted.

In the embodiment, since the processes of S60A and S65 is different from that in FIG. 3, the processing that differs from that in FIG. 3 is mainly described.

In S60A following S50, the processing unit 250 sets and grants a different first incentive than the first incentive set and granted in S60 in the processes of the movie project, and proceeds to S65. When the total travel distance calculated in S50 is above the total travel distance calculated in the previous processes of the movie project, the processing unit 250 sets and grants the user a first incentive with a different content than the previous first incentive. For example, as candidate songs for the sound information 102 to be determined in S80, candidate songs different from the previously granted song are added as the first incentive. The process executed in S60A may be referred to as ninth process.

In S65, the processing unit 250 sets and grants a second incentive and proceeds to S70. The processing unit 250 sets and grants the second incentive to the user when the total travel distance, calculated for each of the movie projects processed in the past, is above a predetermined distance (for example, 100 km). For example, the number of candidate songs for the sound information 102 to be determined in S80 is increased as the second incentive. The candidate songs to be added as the second incentive may be different from the candidate songs added in S60A, and the number of songs to be added may be greater than the number of songs added in S60A. The user who is granted the second incentive can choose songs from a larger number of candidate songs than users who are not granted the incentive. The process executed in S65 may be referred to as eighth process.

The processing unit 250 may also increase the number of filter candidates to be determined in S70 as the second incentive.

<Example of Display Screen>

FIGS. 6A to 6D and 7A to 7C are display screens displayed on the output unit 240 based on control signals sent out from the processing unit 250 of the electronic device 200 in which the movie creation application has been launched, and are examples of operation screens as the input unit 230.

<List Screen>

Figure 6A:
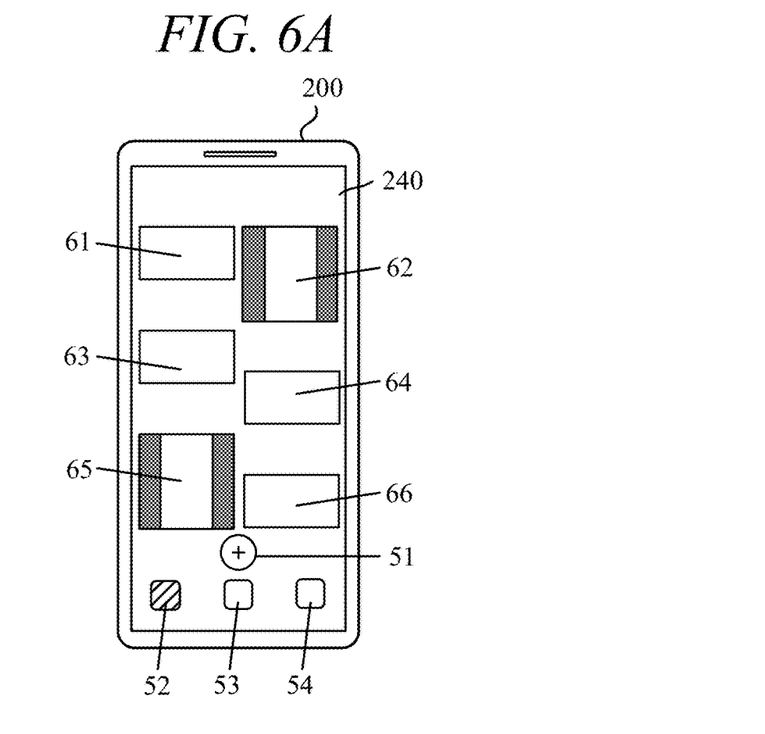
FIG. 6A is a diagram showing an example of a list screen.

FIG. 6A is the list screen that displays a list of video clips taken in the movie project and corresponds to the home screen of the movie creation application. The list screen in FIG. 6A is displayed, for example, before the processing unit 250 executes the processes in the flowchart (FIGS. 3 and 4).

Each of reference numerals 61 to 66 indicates the thumbnail of one frame representing each video clip. The thumbnails refer to reduced images (thumbnail images) with a reduced data size to avoid loss of browsability caused by display of video clips with original data size that is too large.

Thumbnails 61, 63, 64 and 66 are thumbnails when the electronic device 200 is held in landscape mode, and thumbnails 62 and 65 are thumbnails when the electronic device 200 is held in portrait mode. If there are too many video clips to display them all at once, the user can scroll the screen to view the hidden thumbnails.

Figure 7A:
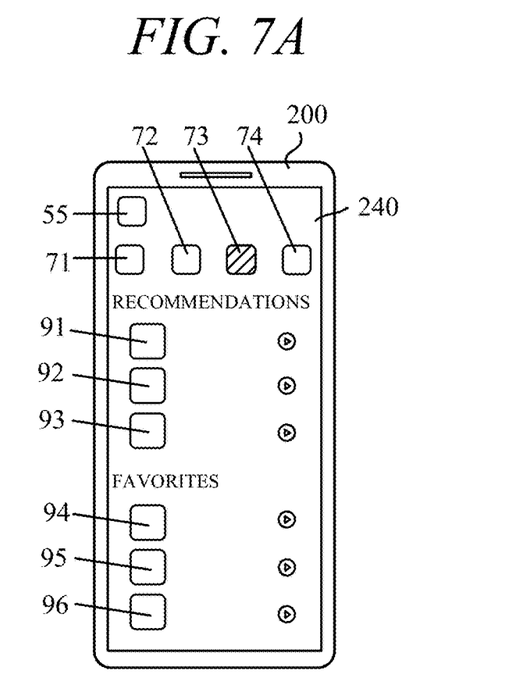
FIG. 7A is a diagram showing an example of a music decision screen.
Figure 7B:
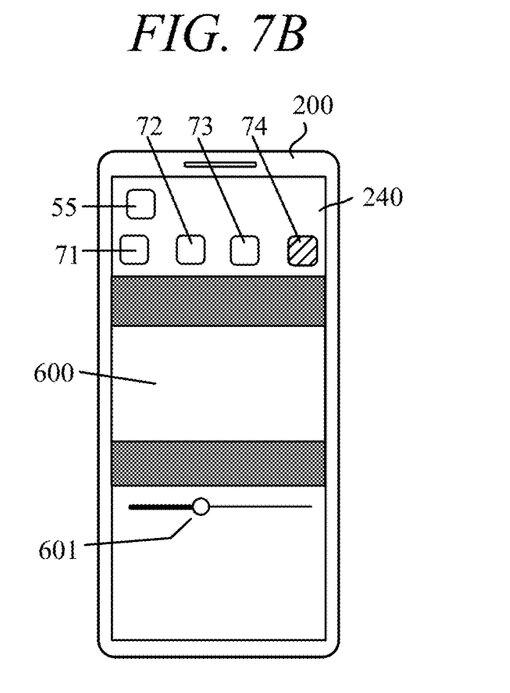
FIG. 7B is a diagram showing an example of a confirmation screen.
Figure 7C:
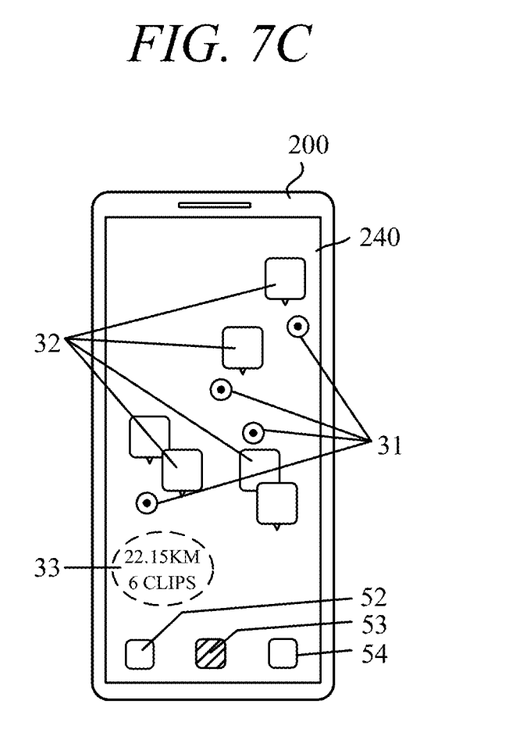
FIG. 7C is a diagram showing an example of a map confirmation screen.

A new button 51 is an operation button that the user taps to start photographing. The processing unit 250 starts the process of S1 (FIG. 3) when the new button 51 is tapped. A list button 52 is an operation button to return to the initial display of the present screen (i.e., to switch the display) (FIG. 6A). A map confirmation button 53 is an operation button to switch the display to a screen displaying the photographing locations of the video clips 1 to 6 on a map screen (FIG. 7C described below). The other work button 54 is an operation button to make the display related to other work items other than those described here (not illustrated).

<Edit Screen>

Figure 6B:
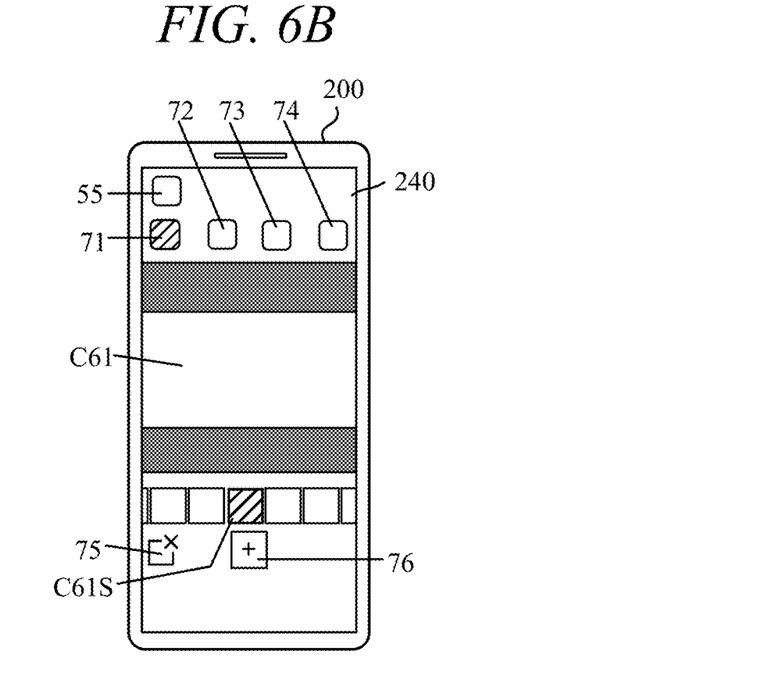
FIG. 6B is a diagram showing an example of an edit screen.

FIG. 6B illustrates an example of the edit screen for the video clips 1 to 6 taken. The edit screen illustrated in FIG. 6B is displayed when, for example, the user taps on the thumbnail 61 in the list screen. A display area C61 indicates the area where the video clip 1 corresponding to the thumbnail 61 is played back and displayed, and displays the thumbnail image of the frame indicated by a cursor C61S among the frames constituting the video clip 1. The user can perform the operation of deleting the image of the frame corresponding to the cursor C61S from the video clip 1 by tapping a delete button 75.

A photographing screen button 76 is used to switch the display to the photographing screen (FIG. 6C) and start photographing. A return button 55 is an operation button to return (i.e., to switch the display) to the display of the list screen (FIG. 6A).

An edit button 71 is an operation button to return (i.e., to switch the display) to the initial display of the present screen (FIG. 6B). A filter button 72 is an operation button to switch the display to the filter decision screen (FIG. 6D below). A music button 73 is an operation button to switch the display to the music decision screen (FIG. 7A below). A confirmation button 74 is an operation button to switch the display to the confirmation screen (FIG. 7B below).

In the embodiment, an edit screen (FIG. 6B), a filter decision screen (FIG. 6D) to be described later, a music decision screen (FIG. 7A) to be described later, and a confirmation screen (FIG. 7B) to be described later are displayed in common in order to enable mutual screen switching between the edit button 71, filter button 72, music button 73, and confirmation button 74. In addition, a return button 55 to return (i.e., to switch the display to) to the above list screen (FIG. 6A) is also commonly displayed on the respective screens (FIGS. 6B, 6D, 7A, and 7B).

<Photographing Screen>

Figure 6C:
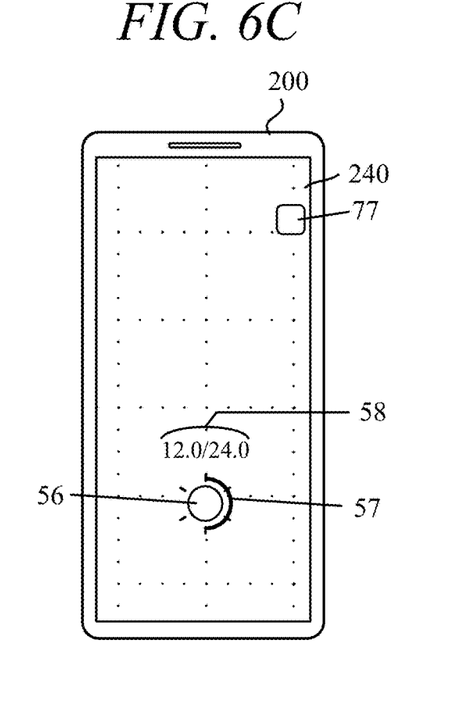
FIG. 6C is a diagram showing an example of a photographing screen.
Figure 6D:
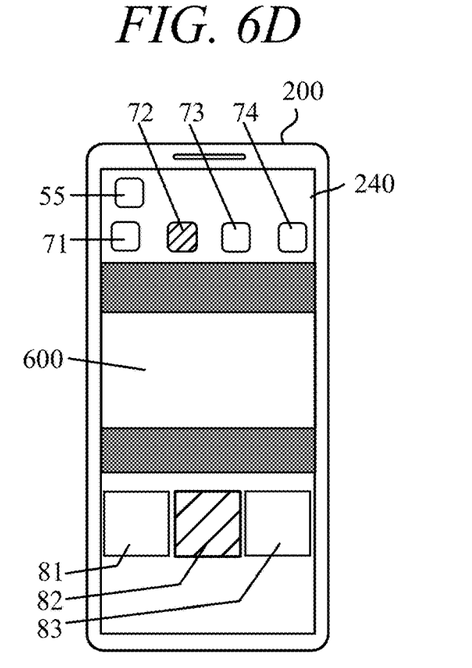
FIG. 6D is a diagram showing an example of a filter decision screen.

FIG. 6C is a diagram illustrating a photographing screen. The photographing screen illustrated in FIG. 6C is displayed when the processing unit 250 executes the process of S20 in the flowchart (FIGS. 3 and 4). FIG. 6C illustrates an example of the photographing screen when photographing is performed with the electronic device 200 held in portrait mode, but it is also possible to perform photographing with the electronic device 200 held in landscape mode.

In the embodiment, a video clip is taken by the camera 210 for 4 seconds each time the photographing button 56 is tapped. An indicator 57 and a display 58 indicate the recorded time out of the total recording time. FIG. 6C illustrates the state in which 4-second video clips 1 to 3 have been recorded, i.e., 12 seconds of the total recording time of 24 seconds have been recorded. An edit button 77 is an operation button to switch the display to the edit screen (FIG. 6B) for editing.

<Filter Decision Screen>

FIG. 6D is a diagram illustrating a filter decision screen. The filter decision screen illustrated in FIG. 6D is displayed when the processing unit 250 executes the process of S70 in the flowchart (FIGS. 3 and 4). A display area 600 displays thumbnail images with a reduced data size of video clips taken. Filter candidate buttons 81, 82, 83, . . . indicate a plurality of filter candidates prepared in advance in the movie creation application. The filter candidate buttons 81, 82, 83, . . . are each associated with the above-described filter processing such as sepia tone and monochrome. When the user taps on the filter candidate button 82 selected arbitrarily, the filter processing corresponding to the operated filter candidate button 82 is determined as the filter processing to be applied to the video clips 1 to 6 used to create a video 10. The filter processing corresponding to the operated filter candidate button 82 is executed on the thumbnail image displayed in the display area 600. The user can check the image processing effect of the filter processing in real time with thumbnail image displayed in the display area 600. The user can also re-operate the other filter candidate button to have different types of filter processing executed on the thumbnail image displayed in the display area 600, and compare the differences in image processing effects.

A keyword button (not illustrated) indicating a plurality of keyword candidates prepared in advance in the movie creation application may be displayed on the filter decision screen, and when the user taps any keyword button, a filter candidate button indicating a plurality of filter candidates corresponding to the operated keyword button may again be displayed on the filter decision screen. When the user taps any of the filter candidate buttons, a thumbnail image with filter processing corresponding to the operated filter candidate button is displayed in the display area 600.

As described above, description of buttons commonly displayed on the respective screens (FIGS. 6B, 6D, 7A, and 7B) are omitted. In the filter decision screen (FIG. 6D), the filter button 72 is an operation button to return (i.e., to switch the display) to the initial display of the present screen (FIG. 6D).

<Music Decision Screen>

FIG. 7A is a diagram illustrating a music decision screen. The music decision screen illustrated in FIG. 7A is displayed when the processing unit 250 executes the process of S80 in the flowchart (FIGS. 3 and 4). Music candidate buttons 91, 92, 93, . . . indicate a plurality of recommended music candidates prepared in advance in the movie creation application. The music candidate buttons 91, 92, 93, . . . are each associated with the sound information to play music. When the user taps any music candidate button, the sound information corresponding to the operated music candidate button is determined as the sound information 102 to be recorded in the video file 100 together with the information 101 on the video 10.

The user can also play and listen to the corresponding music by tapping the play button displayed on the right side of the music candidate buttons 91, 92, 93 . . . .

Music candidate buttons 94, 95, 96, . . . indicate a plurality of favorite music candidates prepared in advance in the movie creation application. The music candidate buttons 94, 95, 96, . . . are each associated with the sound information for playing the music selected by the user in the past. When the user taps any music candidate button, the sound information corresponding to the operated music candidate button is determined as the sound information 102 to be recorded in the video file 100 together with the information 101 on the video 10. As described above, the user can also listen to the corresponding music by tapping the play button displayed on the right side of the music candidate buttons 94, 95, 96, . . . .

As in the case of the filter decision screen, a keyword button indicating a plurality of keyword candidates prepared in advance in the movie creation application may be displayed on the music decision screen, and when the user taps any keyword button, music candidate buttons indicating a plurality of music candidates corresponding to the operated keyword button may be displayed again on the music decision screen.

As described above, description of buttons commonly displayed on the respective screens (FIGS. 6B, 6D, 7A, and 7B) are omitted. In the music decision screen (FIG. 7A), the music button 73 is an operation button to return (i.e., to switch the display) to the initial display of the present screen (FIG. 7A).

<Confirmation Screen>

FIG. 7B is a diagram illustrating a confirmation screen. The confirmation screen illustrated in FIG. 7B is displayed by the processing unit 250 between S80 and S90 in the flowchart (FIGS. 3 and 4). Before proceeding to the process of S90 to combine the video clips 1 to 6 taken N=6 times to create a video 10, the user confirms the six video clips 1 to 6. The display area 600 continues to display thumbnail images of the video clips 1 to 6 with the filter processing determined in S70, together with BGM playing based on the sound information 102 determined in S80.

A bar display 601 indicates how much of the 24 seconds of total recording time of the video clips 1 to 6 has been played back. The user can move forward or backward in the playback position by shifting the knob on the bar display 601 to the left or right.

As described above, description of buttons commonly displayed on the respective screens (FIGS. 6B, 6D, 7A, and 7B) are omitted. In the confirmation screen (FIG. 7B), the confirmation button 74 is an operation button to return (i.e., to switch the display) to the initial display of the present screen (FIG. 7B).

<Map Confirmation Screen>

FIG. 7C is a diagram illustrating a map confirmation screen. When the map confirmation button 53 is tapped in the list screen (FIG. 6A), the map confirmation screen illustrated in FIG. 7C is displayed to replace the list screen.

On the map confirmation screen, marks 31 indicating the photographing locations of the video clips 1 to 6 used to create the video 10 and thumbnail images 32 representing the video clips 1 to 6 are displayed on the map. The total travel distance (22.15 km in the embodiment) calculated in S50 based on the photographing locations of the video clips 1 to 6 is displayed (reference numeral 33), together with the number of video clips N (6 video clips in the embodiment).

The list button 52, map confirmation button 53, and other work button 54 are the same as the buttons described in the list screen (FIG. 6A), and thus, description thereof is omitted. The map confirmation button 53 is used to return (i.e., to switch the display) to the initial display of the present screen (FIG. 7C).

According to the above-described embodiment, the following effects can be achieved.

(1) The movie creation application is a movie creation program that causes a processing unit 250 of an electronic device 200, which includes a camera 210 as a photographing unit for taking video clips 1 to 6 and a positioning unit 270 for obtaining information indicating the photographing locations of the video clips 1 to 6, to execute a movie project and is stored in a computer-readable storage medium.

The movie creation application causes the electronic device 200 to execute a movie project that combines a plurality of video clips 1 to 6 to create a video 10. The movie project includes: a first process (S10) to determine the number N of video clips 1 to 6 be combined as a video 10; a second process (S20) to output a control signal to the camera 210 to take the determined number N of video clips 1 to 6; a third process (S30) to output a control signal to the positioning unit 270 to acquire position information on the photographing locations of the video clips 1 to 6; a fourth process (S50) to connect the photographing locations by a straight line in the order of photographing and calculate the total travel distance for taking the determined number N of video clips 1 to 6; a fifth process (S60) to set and grant the first incentive for the user of the camera based on the total travel distance; and a sixth process (S90) to create a video 10 by combining the determined number N of video clips 1 to 6.

With this configuration, the first incentive is granted according to the total travel distance, which is the sum of the distances traveled, which are indicated by straight lines A to E, between the photographing locations 41 to 46 of the video clips 1 to 6. As a result, it is expected that the user will be motivated to actively move around the photographing site to take video clips 1 to 6 and create a video 10 combining the video clips 1 to 6. In other words, this will allow the user to have more opportunities to take videos.

(2) The movie creation application further causes the processing unit 250 to execute the seventh process that executes the movie project including the above-described first to sixth processes plural times to create a plurality of videos 10 and the eighth process (S65) that sums the total travel distance of the videos calculated in the fourth process of each of the movie projects to set and grant a second incentive different from the first incentive based on the total travel distance.

This configuration is expected to motivate the user to repeatedly execute the movie project to create a video 10. In other words, this will allow the user to have more opportunities to take videos.

(3) When the total travel distance calculated in the fourth process of the movie project executed later is longer than the total travel distance calculated in the fourth process of the movie project executed earlier, the movie creation application further causes the processing unit 250 to execute the ninth process (S60A), which causes the content of the first incentive set and granted in the fifth process of the movie project executed later to be different from the content of the first incentive set and granted in the fifth process of the movie project executed earlier.

This configuration is expected to motivate the user to actively travel longer distances than in previous movie projects to take video clips 1 to 6, and to combine the video clips 1 to 6 to create a video 10. In other words, this will allow the user to have more opportunities to take videos.

(4) The movie creation application causes the processing unit 250 to further execute the tenth process (S100), which adds music information to the information 101 on the video 10 created in the sixth process of the movie project. The first and/or second incentive is information about the music that can be added in the tenth process.

The incentive of music information that can be attached to the video 10 created based on the video clips 1 to 6 is expected to motivate the user who wishes to have music information attached to them to create more videos 10. In other words, this will allow the user to have more opportunities to take videos.

(5) The fourth process calculates the distance on a straight line of a predetermined width from the total travel distance by excluding the distance on the straight line of a predetermined width from the total travel distance when the straight line connecting the photographing locations for each photographing in the photographing order is located on a straight line of a predetermined width.

This configuration makes it possible to exclude overlapping travel distances and calculate the total travel distance appropriately. It is also expected to motivate the user to actively travel to a new photographing site to take video clips 1 to 6 and create a video 10 by combining the video clips 1 to 6.

The above embodiment may be modified into various embodiments. Hereinafter, modifications will be described.

(Modification 1)

As described above, the 4 seconds of recording time per clip, 6 video clips, and 24 seconds of total recording time and playback time for the video 10 in the embodiment are simply examples. The total recording time and playback time of the video 10 may be reduced to 12 seconds or extended to 48 seconds.

(Modification 2)

In the above-described embodiment, the processing unit 250 of the electronic device 200 executing the movie creation application determined a recording time of 4 seconds per clip so that the total recording time would be 24 seconds, depending on the determined photographing number N. Alternatively, the recording time per clip may be configured to be determined based on the duration of the photographing operation by the user.

In the modification 2, the processing unit 250 executes the following processes of S10A, S20A, and S30A instead of S10 to S40 in FIG. 3.

In S10A, the processing unit 250 causes the camera 210 to take a video clip according to the tap time for the photographing button 56 displayed on the output unit 240. For example, when the tap time is from 0.1 to 0.5 seconds, the photographing time per clip is 0.5 seconds. When the tap time is from 0.5 to 1.0 seconds, the photographing time per clip is 1.0 second. When the tap time is from 1.0 to 1.5 seconds, the photographing time per clip is 1.5 seconds. In the same manner thereafter, the photographing time of the video clip is determined in 0.5 second increments. However, the maximum photographing time per clip shall be 4 seconds.

In S20A, the processing unit 250 causes the positioning unit 270 to locate the current position of the electronic device 200 and proceeds to S30A. As in the case of S30, the positioning unit 270 acquires information indicating the current position at the time of the video clip was started to be taken and outputs it to the processing unit 250 as information on the photographing location of the video clip.

In S30A, the processing unit 250 determines whether the total recording time of the video clips is above 24 seconds. When the total recording time is above 24 seconds, the processing unit 250 makes a positive determination in S30A and proceeds to S50 in FIG. 3. The processes after S50 are the same as the description of the above-described embodiment.

When the total recording time is less than 24 seconds, the processing unit 250 makes a negative determination in S30A, returns to S10A, and repeats the above processing. That is, the processing unit 250 causes a video clip to be taken with a photographing time according to the tap time until the total recording time exceeds 24 seconds.

In a case where the total recording time is above 24 seconds, for the portion of the last video clip taken by the camera 210 that exceeds the total recording time of 24 seconds, the processing unit 250 may urge the user to perform an editing operation to delete the excess by displaying a message on output unit 240 or by other means. The portion of the video that exceeds the total recording time of 24 seconds may be automatically deleted.

The processes of S10A to S30A according to the modification 2 described above allow to determine the recording time of video clips constituting a video 10 based on the duration of the photographing operation by the user.

The above embodiment can be combined as desired with one or more of the aforesaid modifications. The modifications can also be combined with one another.

According to the present invention, it becomes possible to allow the user to have more opportunities to take videos.

Above, while the present invention has been described with reference to the preferred embodiments thereof, it will be understood, by those skilled in the art, that various changes and modifications may be made thereto without departing from the scope of the appended claims.

The invention claimed is:

1. A movie creation method for creating a movie by combining a plurality of video clips photographed by a camera, comprising:
   executing a movie project, wherein
   the movie project includes:
      determining a number of the video clips to be combined as a video;
      outputting a control signal to the camera to photograph the determined number of the video clips;
      outputting a control signal to a positioning unit to acquire position information on photographing locations of the video clips;
      calculating a total travel distance for photographing the determined number of the video clips by connecting the photographing locations by a straight line in an order of photographing;
      setting an incentive for a user of the camera based on the total travel distance; and
      creating the video by combining the determined number of the video clips.

2. The movie creation method according to claim 1, wherein
   the incentive is a first incentive, wherein
   the movie creation method further comprises:
      creating a plurality of the videos by executing the movie project plural times;
      calculating a sum of a plurality of the total travel distances calculated in the plural times of the movie project; and
      setting a second incentive for the user based on the sum, the second incentive being different from the first incentive.

3. The movie creation method according to claim 2, wherein
   the movie project further includes:
      changing a content of the first incentive set in a current time of the movie project from a content of the first incentive set in a previous time of the movie project when the total travel distance calculated in the current time of the movie project is longer than the total travel distance calculated in the previous time of the movie project.

4. The movie creation method according to claim 1, wherein
   the movie project further includes:
      adding a music to the video, wherein
      at least one of the first incentive and the second incentive is the music to be added to the video.

5. The movie creation method according to claim 1, wherein
   the calculating the total travel distance includes:
      excluding a length of a part of the straight line connecting the photographing locations in the order of photographing on a straight line of a predetermined width from the total travel distance.

6. A non-transitory computer readable medium storing a movie creation program that, when executed by an electronic device including: a microcomputer; a camera configured to photograph a video clip; and a positioning unit configured to acquire position information on a photographing location of the video clip, causes the microcomputer to execute a movie project for creating a movie by combining a plurality of the video clips photographed by the camera, wherein
   the movie project includes:
      determining a number of the video clips to be combined as a video;

outputting a control signal to the camera to photograph the determined number of the video clips;

outputting a control signal to the positioning unit to acquire position information on the photographing locations of the video clips;

calculating a total travel distance for photographing the determined number of the video clips by connecting the photographing locations by a straight line in an order of photographing;

setting an incentive for a user of the electronic device based on the total travel distance; and creating the video by combining the determined number of the video clips.

7. The non-transitory computer readable medium according to claim 6, wherein the incentive is a first incentive, wherein the movie creation program further causes the microcomputer to perform:

creating a plurality of the videos by executing the movie project plural times;

calculating a sum of a plurality of the total travel distances calculated in the plural times of the movie project; and setting a second incentive for the user based on the sum, the second incentive being different from the first incentive.

8. The non-transitory computer readable medium according to claim 7, wherein the movie project further includes:

changing a content of the first incentive set in a current time of the movie project from a content of the first incentive set in a previous time of the movie project when the total travel distance calculated in the current time of the movie project is longer than the total travel distance calculated in the previous time of the movie project.

9. The non-transitory computer readable medium according to claim 6, wherein the movie project further includes:

adding a music to the video, wherein at least one of the first incentive and the second incentive is the music to be added to the video.

10. The non-transitory computer readable medium according to claim 6, wherein the calculating the total travel distance includes:

excluding a length of a part of the straight line connecting the photographing locations in the order of photographing on a straight line of a predetermined width from the total travel distance.

11. A movie creation apparatus configured to execute a movie project for creating a movie by combining a plurality of video clips, comprising:

a camera configured to photograph the video clips; and a positioning unit configured to acquire position information on photographing locations of the video clips, wherein the movie project includes:

determining a number of the video clips to be combined as a video;

outputting a control signal to the camera to photograph the determined number of the video clips;

outputting a control signal to the positioning unit to acquire the position information on photographing locations of the video clips;

calculating a total travel distance for photographing the determined number of the video clips by connecting the photographing locations by a straight line in an order of photographing;

setting an incentive for a user based on the total travel distance; and creating the video by combining the determined number of the video clips.

* * * * *